March 25, 1924.
E. C. SMITH
1,488,173
FRONT TRUCK CONSTRUCTION FOR SPREADERS
Original Filed March 26, 1920   2 Sheets-Sheet 2
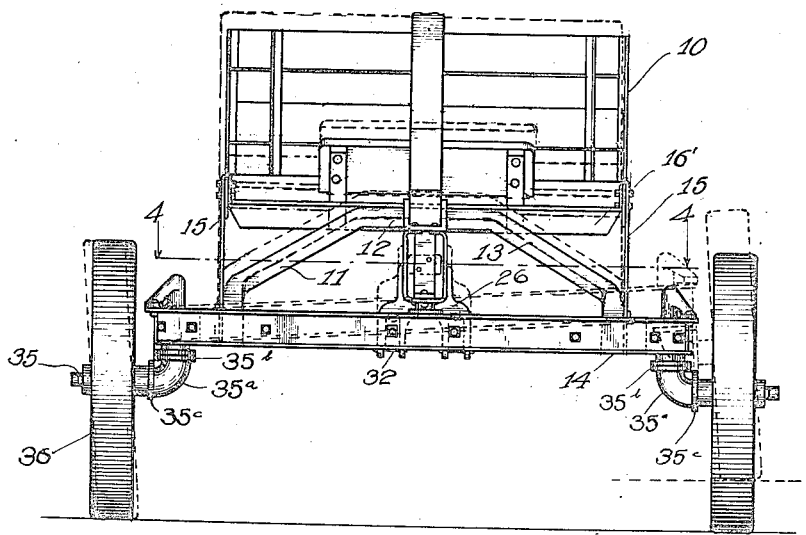
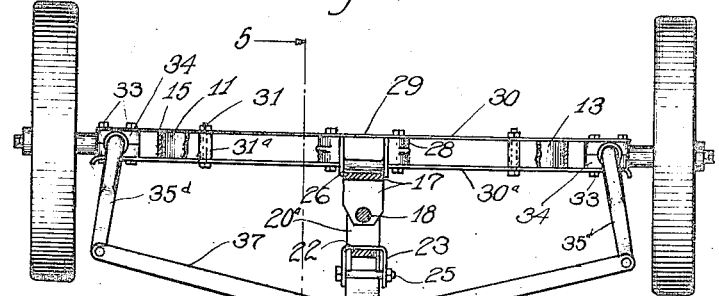
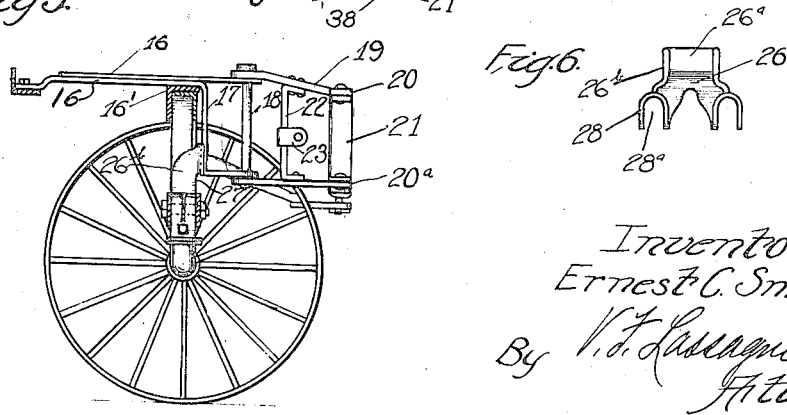
Inventor:
Ernest C. Smith,
By V. F. Lassagne
Atty.

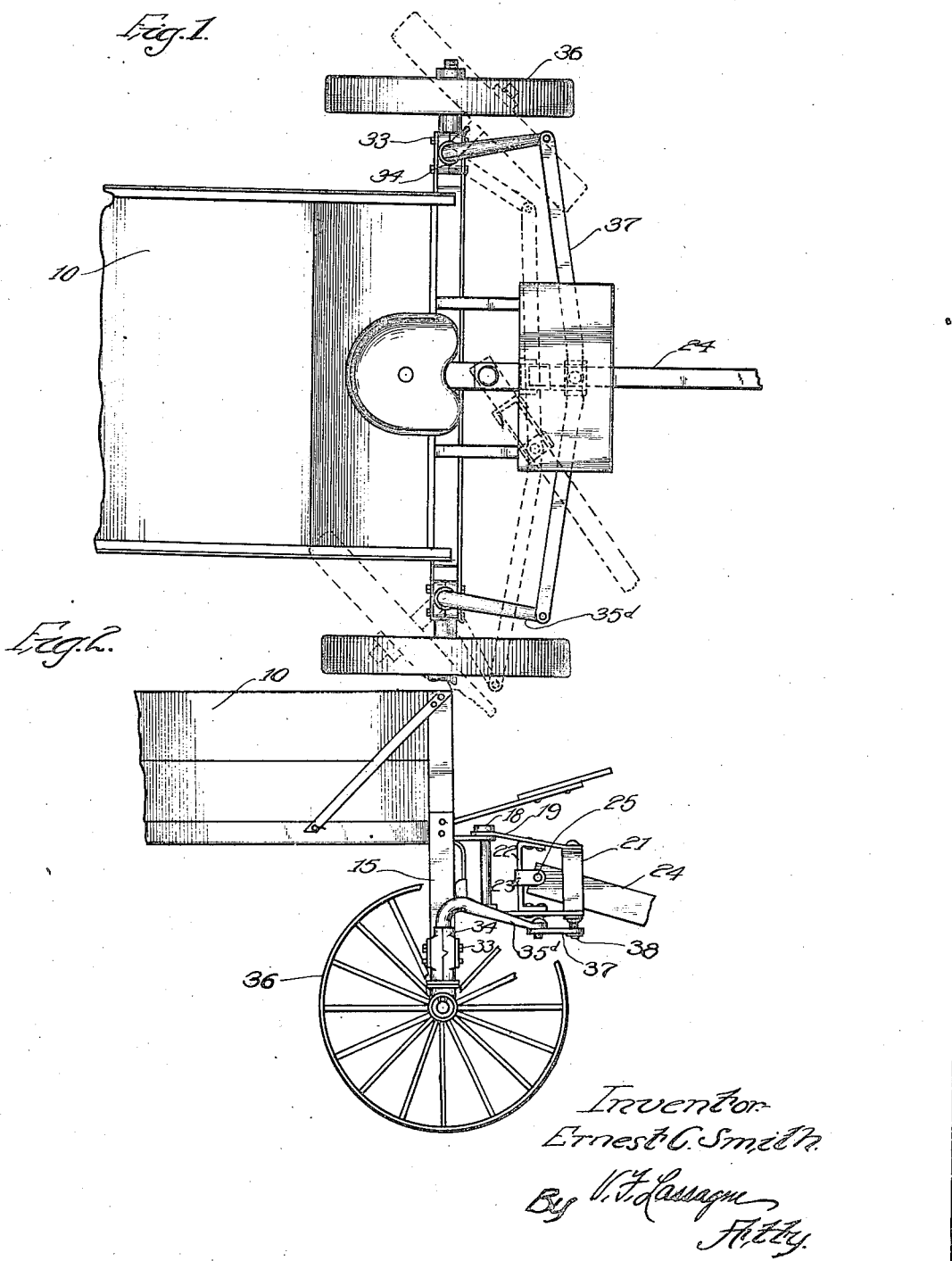

Patented Mar. 25, 1924.

1,488,173

UNITED STATES PATENT OFFICE.

ERNEST C. SMITH, OF CHICAGO, ILLINOIS, ASSIGNOR TO INTERNATIONAL HARVESTER COMPANY, A CORPORATION OF NEW JERSEY.

FRONT-TRUCK CONSTRUCTION FOR SPREADERS.

Application filed March 26, 1920, Serial No. 369,074. Renewed March 6, 1922. Serial No. 541,589.

*To all whom it may concern:*

Be it known that I, ERNEST C. SMITH, a citizen of the United States, residing at Chicago, in the county of Cook and State of Illinois, have invented certain new and useful Improvements in Front-Truck Constructions for Spreaders, of which the following is a full, clear, and exact specification.

My invention relates to running gear for vehicles, and more particularly to a front truck construction for straw and manure spreaders but also capable of application to road and field machines and vehicles in general.

The principal object of my invention is to so construct and relate the truck and body of the vehicle as to permit either wheel, on an axle that is held against horizontal swivelling, to ride over inequalities in the road or field and rock the axle without tilting the body laterally, and to so support the body on the axle as to minimize the tendency of the body to tilt laterally on its points of support during travel under ordinary conditions.

Other objects are to eliminate the need for longitudinal bracing elements for the axle, and to combine therewith steering gear of the stub axle type connected with a draft bar or tongue attached to the body so as to be capable of both lateral and vertical movement.

I have accomplished these objects by providing an axle of novel construction, and supporting the body thereon by means of a novel connection which affords a two-point bearing, and thus gives the body considerable stability while permitting the axle to rock when necessary, and also by providing the body with guiding elements which engage the axle in a novel manner and restrain it against movement in any but a vertical plane. With this axle there are associated swiveled stub axles, with which draft gear of novel construction is connected.

With these main and other incidental objects in view, my invention consists of the organization, details of construction, parts, or their equivalents, hereinafter described, and more particularly defined in the claims.

Referring to the drawings—

Fig. 1 is a top plan view of the forward portion of a manure spreader embodying my invention, the dotted lines showing the position of the steering gear when making a turn;

Fig. 2 is a side elevation of Fig. 1;

Fig. 3 is a front elevation showing in dotted lines the raised portion of the body;

Fig. 4 is a horizontal section along line 4—4 of Fig. 3;

Fig. 5 is a vertical section along line 5—5 of Fig. 4; and,

Fig. 6 is a detail view of the casting forming the connection between the body and axle.

The structure embodying my invention comprises the vehicle body 10, which may consist of a wooden box or receptacle and a metal subframe, the forward portions of which are shown in the drawings. Under the forward end of the body there is secured an arched angle-iron member 11, preferably formed with a horizontal portion 12, laterally inclined portions 13, and vertical ends 14; and vertical guide members or bars 15 are bolted or otherwise secured to the ends 14 and to the sides of the body.

Centrally of the transverse portion 12 of the arched member there is secured a pair of longitudinally extending superposed flat metal members 16 (Fig. 5), which are fastened to the body frame at the rear of the arched member 11, in any suitable way, as well as to the horizontal web of a transverse angle iron member 16' forming part of the body frame, and within which the arched member 11 is also secured, as shown in Figs. 3 and 5, member 11 thus serving to brace and hold the guide bars 15 in position and to strengthen and support member 16'

The upper member 16 extends forwardly a short distance in advance of the arched member 11, while the under member is bent downwardly and then outwardly at right angles, as indicated at 17 (Fig. 5), with the outwardly extending arm of the under member parallel to the end of the upper member, and both provided with aligned apertures for receiving a coupling pin or bolt 18.

This pin 18 provides a vertical pivotal connection between the spaced ends of the members 16 and a tongue bracket 19, which comprises longitudinally extending vertically spaced arms 20, 20ª, through which the pin 18 passes at the rear ends. The arms of the tongue bracket preferably converge slightly toward their forward ends, and are there connected by the complemental members 21, which together form a collar at the outer end of the bracket arms. Intermediate their ends the bracket arms are connected and braced by a vertical member 22, and at approximately the middle of this vertical member a transverse U-shaped member 23 is secured with its arms extending forwardly. Between these arms is received the rear end of a draft element or tongue 24, which is pivotally connected thereto for vertical movement by pin 25. This draft element passes through the collar formed by members 21, and is vertically movable therebetween, but can move laterally only in unison with the bracket 19 about the pivot or pin 18. The vertical leg of the angle portion 17 has riveted or otherwise secured thereto on its rear face a casting 26, comprising a central web 26ª, the upper portion of which is fixed to said angle portion 17 and side webs 26ᵇ formed at right angles to the central web. These webs extend rearwardly and downwardly, as at 27 (Fig. 5), and the side webs are developed into U-shaped portions 28 providing bearing grooves or forks 28ª (Fig. 6).

For cooperation with the structure above described, there is provided an axle 29 formed of spaced bars 30 and 30ª, connected at intervals by bolts 31 carrying spacing sleeves 31ª. Two of these bolts are positioned at the middle of the axle and spaced a distance corresponding to the distance between the centers of the bearing grooves 28ª. Casting 26 is received between the spaced bars 30, 30ª, and the bearing forks straddle these two bolts and rest thereon, thus providing a two-point support for the vehicle body, on either of which the axle can rock. Incidentally, the spread forks of the casting assist in guiding the rocking movement of the axle and their movable interlocked relation with the bolts on which they rest also prevents endwise shifting of the axle. If desired, the bearing forks may be closed by transverse pins 32, which serve to prevent separation of the body and axle, and also to limit rocking movement of the axle.

In proximity to the outer ends of the axle the vertical ends 14 of the arched member, together with the guide bars 15, are received between the axle bars 30, 30ª, and these serve to brace the axle against horizontal swivel movement and to guide it in a vertical plane when it rocks.

At each end of the axle and between the bars 30, 30ª, there is secured by bolts 33 a two-part bearing block 34, and in each block there is journaled the vertical portion of a stub axle 35. An elbow 35ª, formed with horizontal and vertical flanges 35ᵇ and 35ᶜ, is cast on the angle between the horizontal and vertical parts of each stub axle, the bearing blocks resting on the horizontal flanges while the hubs of the wheels 36 bear against the vertical flanges. The vertical portion of each stub axle has an integral forwardly extending steering arm 35ᵈ at its upper end. These arms diverge somewhat, as seen in Fig. 4, and are pivotally connected to links 37, which in turn are pivotally connected to the tongue bracket at 38, thus causing the stub axles to follow the lateral movement of the draft connection and tongue bracket.

It results from the construction above described that passage of either wheel 36 over an obstruction will rock the axle on one of its points of connection with the vehicle body, and thus raise the body vertically without causing any appreciable tilt, as indicated in dotted lines of Fig. 3. At the same time the relation of the arched member 11 to the axle prevents it from moving in any but a vertical plane, and effectively braces it against strains when turning, while the construction of the steering gear is such that a short turn can be made as effectively as in the old fifth wheel construction.

It will be evident from the above that I have devised a simple and efficient construction for the purpose desired, and, while I have described a specific embodiment of my invention, such variation in the structure may be made as comes within the scope of the appended claims.

What I claim as my invention is:

1. In a vehicle, an axle, a body having a centrally arranged depending member formed with transversely spaced bearing portions, and a pair of correspondingly spaced horizontally extending pins on the axle engaged by said bearing portions, whereby said body may rock on either pin as a point of support.

2. In a vehicle, a body, a central casting secured beneath the body and formed with transversely spaced vertically extending bearing slots, and an axle provided with an opening receiving said casting and with horizontally extending spaced rests positioned in said slots.

3. In a vehicle, an axle formed with a longitudinally extended vertical opening and having transverse elements bridging said opening at each side of the middle of the axle, and a body provided with a central depending member having laterally spaced bearing portions received in said opening and supported for rocking movement on said elements.

4. In a vehicle, an axle comprising a pair of spaced bars and a spindle block secured between said bars at each end of the axle, transverse spacing elements between said bars at each side of the middle of the axle, and a body provided with a central depending member including a casting formed with laterally spaced bearing portions extending into the space between said axle bars and loosely supported on said spacing elements.

5. In a vehicle, an axle comprising a pair of spaced bars and a spindle block secured between said bars at each end of the axle, a body provided with a central support formed with transversely spaced bearing forks engaging said axle, and a transversely extending arched member with its middle portion secured to said body and its ends engaged in the space between said bars for preventing horizontal angular movement of the axle with respect to the body, and vertical members connecting the ends of said arch with the sides of the body.

6. In a vehicle, an axle comprising a pair of spaced bars and a spindle block secured between said bars at each end of the axle, a body provided with a central support formed with transversely spaced bearing forks engaging said axle, and vertical members secured to each side of the body and extending into the space between said bars.

7. In a vehicle, an axle, laterally spaced horizontally extending pivot members at the middle of the axle, a body provided with a centrally disposed support formed with spaced bearing forks receiving said pivot members whereby the axle may rock in a vertical plane on either of said members, and means for guiding the rocking movement of the axle in a vertical plane.

8. In a vehicle, an axle having an elongated opening extending vertically therethrough, a body having a central bearing member formed with a portion received in said opening, a pair of spaced supports secured within said opening with which said portion movably interlocks and means on said portion engaging said supports and restraining the axle from endwise shifting but permitting it to rock vertically.

9. In a vehicle, a body, an axle comprising a pair of transversely extending bars arranged side by side, carrying wheels journaled on said axle, spacing elements between said bars at each side of the middle of the axle, a bearing member carried by said body having a projecting part extending downwardly between said spacing elements and said axle bars, bearing portions on said projecting part cooperating with said spacing elements to form a rocking connection, and rigid guiding means depending from the vehicle body at each side thereof and slidably engaging said axle.

10. In a vehicle, a body, an axle supporting the front of said body comprising parallel spaced bars, spindle blocks mounted between the ends of said bars, body carrying means secured between said bars at the middle of the axle, a downwardly projecting bracket secured to said body and provided with a pair of laterally spaced bearing portions resting on said carrying means and forming a rocking connection therewith, and vertical guide bars secured to the sides of said body and extending downwardly into the space between the axle bars.

11. In a vehicle, a body, an axle supporting the front of said body comprising parallel spaced bars, spindle blocks mounted between the ends of said bars, a pair of spaced body carrying means secured between said bars at substantially the middle of the axle, depending means adapted to support said body on said body carrying means and forming a rockable connection therewith, and vertical guide bars secured to the sides of the body and extending downwardly into the space between the axle bars.

12. In a vehicle, a body, an axle supporting the front of said body comprising parallel spaced bars, spindle blocks mounted between the ends of said bars, a pair of spaced horizontally disposed pins secured between said bars at substantially the middle of the axle, a pair of depending members adapted to rockably support the body on said pins, and vertical guide bars secured to the sides of the body and extending downwardly into the space between the axle bars.

In testimony whereof I affix my signature.

ERNEST C. SMITH.